(12) United States Patent
Tomiki

(10) Patent No.: US 10,618,561 B2
(45) Date of Patent: Apr. 14, 2020

(54) VEHICLE FRONT STRUCTURE

(71) Applicant: Toyota Jidosha Kabushiki Kaisha, Toyota-shi, Aichi-ken (JP)

(72) Inventor: Kenshi Tomiki, Ichinomiya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 148 days.

(21) Appl. No.: 15/921,993

(22) Filed: Mar. 15, 2018

(65) Prior Publication Data
US 2018/0265134 A1    Sep. 20, 2018

(30) Foreign Application Priority Data

Mar. 15, 2017    (JP) ................... 2017-049864

(51) Int. Cl.
| | | |
|---|---|---|
| B62D 21/15 | (2006.01) | |
| B62D 25/04 | (2006.01) | |
| B62D 27/02 | (2006.01) | |
| B62D 25/08 | (2006.01) | |
| B62D 25/14 | (2006.01) | |
| B62D 27/00 | (2006.01) | |

(52) U.S. Cl.
CPC ............ *B62D 21/152* (2013.01); *B62D 25/04* (2013.01); *B62D 25/082* (2013.01); *B62D 25/145* (2013.01); *B62D 27/00* (2013.01); *B62D 27/02* (2013.01)

(58) Field of Classification Search
CPC .... B62D 21/152; B62D 25/04; B62D 25/145; B62D 27/00; B62D 27/02; B62D 25/082

USPC ..................................... 296/187.09, 193.06
See application file for complete search history.

(56) References Cited

U.S. PATENT DOCUMENTS 5,586,799 A *  12/1996  Kanemitsu ........... B62D 25/147
                                          296/203.02
8,459,728 B2 *  6/2013  Fujii .................... B62D 25/082
                                          296/187.09

FOREIGN PATENT DOCUMENTS

| JP | H0642542 U | 6/1994 |
| JP | H11105738 A | 4/1999 |
| JP | 2010111169 A | 5/2010 |

\* cited by examiner

*Primary Examiner* — Joseph D. Pape
*Assistant Examiner* — Dana D Ivey
(74) *Attorney, Agent, or Firm* — Dinsmore & Shohl LLP

(57) ABSTRACT

Provided is a vehicle front structure including: a tubular front pillar; a front pillar reinforcing member mounted inside the front pillar; a dashboard cross-member that is mounted on a dashboard panel disposed on the front side of the front pillar in a vehicle front-rear direction and extends in a vehicle width direction; an inner panel reinforcing member that is disposed on the rear side of the front pillar in the vehicle front-rear direction and extends in the vehicle width direction; and a front pillar inner gusset to which an end of the dashboard cross-member in the vehicle width direction and an end of the inner panel reinforcing member in the vehicle width direction are connected, wherein the front pillar inner gusset is fastened to the front pillar reinforcing member.

5 Claims, 10 Drawing Sheets

VEHICLE FRONT STRUCTURE

CROSS-REFERENCE TO RELATED APPLICATIONS

This application claims priority to Japanese Patent Application No. 2017-049864 filed on Mar. 15, 2017, which is incorporated herein by reference in its entirety including the specification, drawings and abstract.

BACKGROUND

1. Technical Field

The present disclosure relates to a vehicle front structure, and more particularly to a structure for connecting a dashboard cross-member and an inner panel reinforcing member to a front pillar of a vehicle.

2. Description of Related Art

A front engine compartment and a cabin of a vehicle are separated from each other by a dashboard panel that is disposed on the front side of front pillars. An inner panel reinforcing member which extends in a vehicle width direction and on which a steering wheel is supported is disposed on the rear side of the front pillars in a vehicle front-rear direction. Ends of each of the dashboard panel and the inner panel reinforcing member in the vehicle width direction are connected to the front pillars.

If a vehicle having such a structure is involved in a frontal collision, the dashboard panel is displaced backward by a load applied to the vehicle body from the front side. As a result, an inner panel of the front pillar may fall toward the inner side of the vehicle, and the inner panel reinforcing member may be displaced backward. Any backward displacement of the dashboard panel will bring the dashboard panel closer to the legs of the driver. Any backward displacement of the inner panel reinforcing member will bring the steering wheel closer to the driver.

To restrain such displacement, a structure has been proposed in which a brittle portion is provided between a front pillar front part to which a dashboard panel is connected and a front pillar rear part to which an inner panel reinforcing member is connected (e.g., see Japanese Patent Application Publication No. 11-105738 (JP 11-105738 A)). When a load is applied from the front side, the impact is absorbed as the brittle portion is buckled in the vehicle front-rear direction and a portion of the dashboard panel that is connected to the front pillar is deformed. Thus, the backward displacement of the inner panel reinforcing member disposed on the rear side of the dashboard panel is restrained. However, the vehicle front structure described in JP 11-105738 A may cause an undue backward displacement of the dashboard panel in the event of a frontal collision.

SUMMARY

The present disclosure provides a vehicle front structure that is able to restrain the backward displacement of a dashboard panel and an inner panel reinforcing member in the event of a frontal collision of a vehicle.

A vehicle front structure of the present disclosure includes: a tubular front pillar; a front pillar reinforcing member mounted inside the front pillar; a dashboard cross-member that is mounted on a dashboard panel disposed on the front side of the front pillar in a vehicle front-rear direction and extends in a vehicle width direction; an inner panel reinforcing member that is disposed on the rear side of the front pillar in the vehicle front-rear direction and extends in the vehicle width direction; and a front pillar inner gusset to which an end of the dashboard cross-member in the vehicle width direction and an end of the inner panel reinforcing member in the vehicle width direction are connected. The front pillar inner gusset is fastened to the front pillar reinforcing member.

When the front pillar inner gusset, to which the end of the dashboard cross-member in the vehicle width direction and the end of the inner panel reinforcing member in the vehicle width direction are connected, is thus fastened to the front pillar reinforcing member, in the event of a frontal collision, a collision load acting in the front-rear direction that is transmitted to the front pillar inner gusset can be transmitted through the front pillar reinforcing member to the front pillar outer panel. As a result, the backward displacement of the dashboard cross-member and the inner panel reinforcing member in the event of a frontal collision can be restrained.

In the vehicle front structure of the present disclosure, the front pillar inner gusset may be fastened to the front pillar as well.

When the front pillar inner gusset is thus fastened to the front pillar reinforcing member and the front pillar, a collision load can be dispersed more effectively. As a result, the backward displacement of the dashboard cross-member and the inner panel reinforcing member in the event of a frontal collision can be restrained more effectively.

The vehicle front structure of the present disclosure may further include an upper member that is disposed on the front side of the front pillar in the vehicle front-rear direction, and is fastened to the front pillar near a position at which the front pillar reinforcing member is mounted inside the front pillar.

When the upper member is thus fastened near the position at which the front pillar reinforcing member is mounted inside the front pillar, in the event of a frontal collision, a collision load acting in the vehicle front-rear direction that is transmitted from the upper member can be transmitted to the front pillar. As a result, the vehicle can be decelerated.

In the vehicle front structure of the present disclosure, the front pillar may be a hollow elongated member composed of a front pillar outer panel and a front pillar inner panel, both being a thin-walled elongated member having a channel cross-sectional shape, that are connected to each other so that the front pillar has a substantially rectangular tubular shape. The front pillar reinforcing member may be a thin-walled member having a channel cross-sectional shape and including flanges and a web, and be mounted inside the front pillar so that the flanges and the web intersect the front pillar as seen from the vehicle width direction and that the web is located on the side of the front pillar inner panel. The front pillar inner gusset may be fastened to the front pillar inner panel and the web of the front pillar reinforcing member.

This configuration can provide a lightweight and strong front structure, which can effectively restrain the backward displacement of the dashboard cross-member and the inner panel reinforcing member.

In the vehicle front structure of the present disclosure, the upper member may be fastened to the front pillar outer panel.

In the event of a frontal collision, this configuration allows a load acting in the vehicle front-rear direction that is transmitted from the upper member to be smoothly transmitted to the front pillar outer panel. As a result, the vehicle can be decelerated more effectively.

In the vehicle front structure of the present disclosure, the front pillar inner gusset, the front pillar inner panel, and the web of the front pillar reinforcing member may be fastened together with a bolt.

Thus, the backward displacement of the dashboard cross-member and the inner panel reinforcing member in the event of a frontal collision can be restrained by a simple configuration.

The present disclosure can restrain the backward displacement of a dashboard panel and an inner panel reinforcing member in the event of a frontal collision of a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
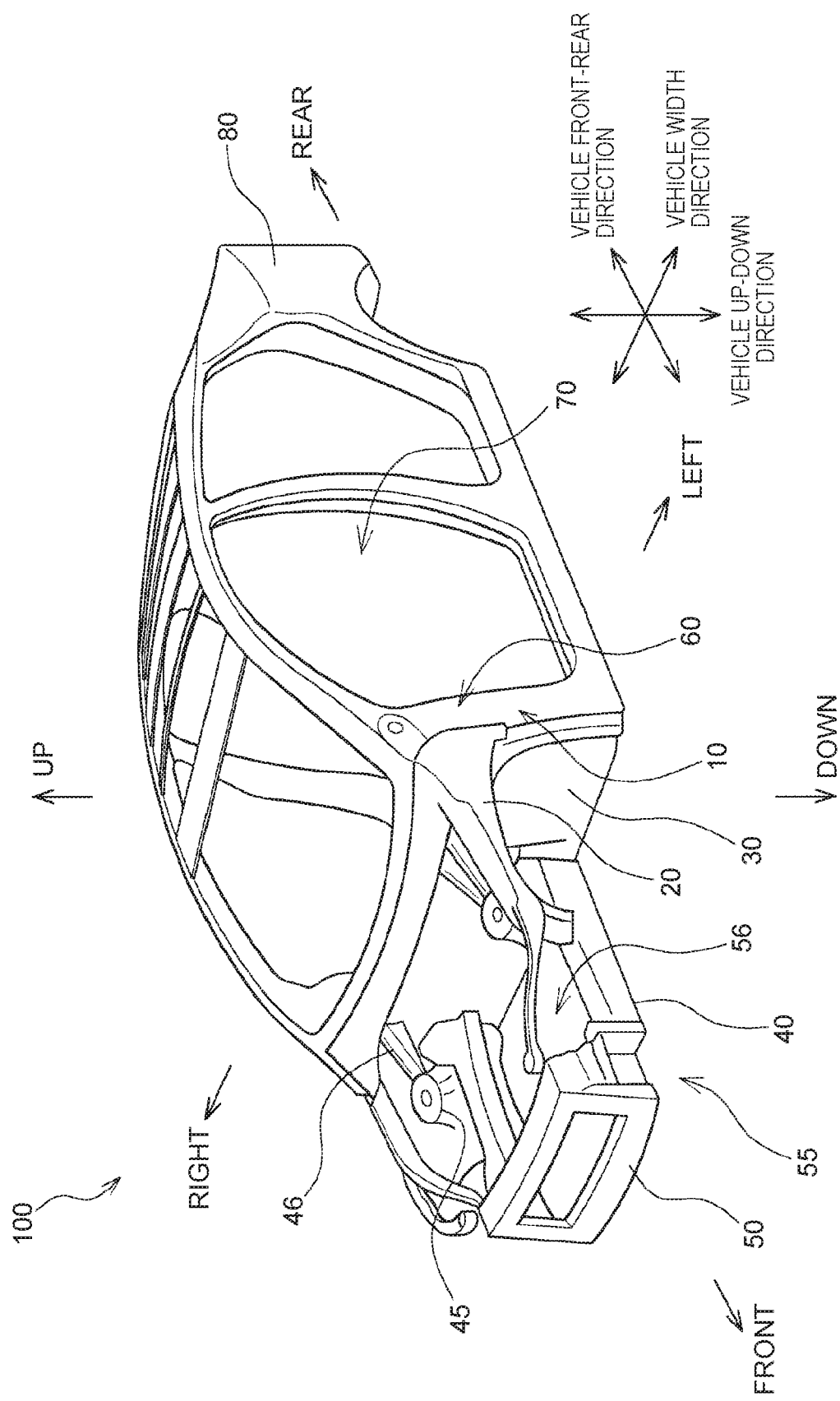
FIG. 1 is a perspective view showing a frame structure of a body of a vehicle in which a front structure according to an embodiment of the present disclosure is incorporated.

A vehicle front structure 60 of an embodiment will be described below with reference to the drawings. First, a body structure of a vehicle 100 in which the front structure 60 of the embodiment is incorporated will be described with reference to FIG. 1. As shown in FIG. 1, the vehicle 100 includes a frame structure made of metal, such as aluminum. The vehicle 100 includes a front frame 55 on the front side from front pillars 10, a rear frame 80, and a cabin frame 70 between the front pillars 10 and the rear frame 80. The front frame 55 includes: a front reinforcing member 50 connected to a front bumper (not shown); side members 40 connected to the front reinforcing member 50; a dashboard panel 30 that divides between the cabin frame 70 and an engine compartment 56; the front pillars 10; and upper members 20 that are respectively connected to the front pillars 10 and extend toward the vehicle front side. The upper members 20 connect the front reinforcing member 50 and the front pillars 10 to each other above the side members 40. An engine, a drive motor, etc. are installed on the side members 40. Suspension towers 45 that house a suspension system of front wheels are provided between the side members 40 and the upper members 20. The suspension towers 45 and the dashboard panel 30 are connected to each other through suspension tower braces 46.

Figure 2:
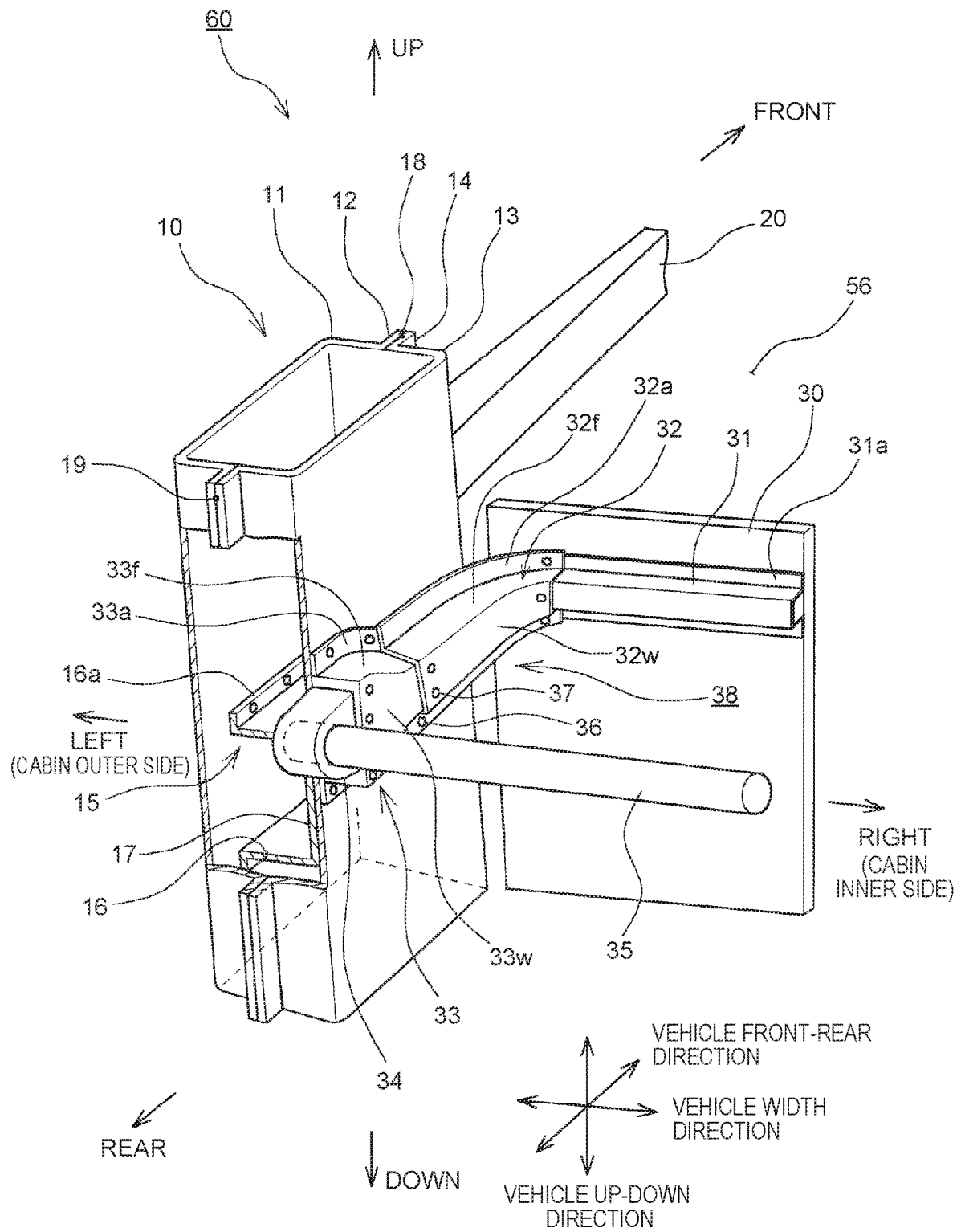
FIG. 2 is a perspective view of the front structure according to the embodiment of the present disclosure.

FIG. 2 is a perspective view of the front structure 60 that is a structure of a part at which the front pillar 10, the upper member 20, a dashboard cross-member 31, an inner panel reinforcing member 35, and a front pillar inner gusset 38 are connected to one another, as seen from the inner side of the cabin located on the rear side of the dashboard panel 30 in a vehicle front-rear direction.

As shown in FIG. 2, the front structure 60 of this embodiment includes: the substantially rectangular tubular front pillar 10; a front pillar reinforcing member 15 mounted inside the front pillar 10; the dashboard cross-member 31 that is mounted on the dashboard panel 30 disposed on the front side of the front pillar 10 in the vehicle front-rear direction and extends in a vehicle width direction; the inner panel reinforcing member 35 that is disposed on the rear side of the front pillar 10 in the vehicle front-rear direction and extends in the vehicle width direction; and the front pillar inner gusset 38 to which an end of the dashboard cross-member 31 in the vehicle width direction and an end of the inner panel reinforcing member 35 in the vehicle width direction are connected. The front pillar inner gusset 38 is composed of a gusset main body 33, a front pillar brace 32, and a connection arm 34.

As shown in FIG. 2, the front pillar 10 is a hollow elongated member formed by connecting a front pillar outer panel 11 and a front pillar inner panel 13, both being a thin-walled elongated member having a channel cross-sectional shape, to each other by spot welding at their respective band plate-shaped connection ribs 12, 14 so as to form a substantially rectangular tubular shape. Reference signs 18, 19 in FIG. 2 each denote a welded joint. The front pillar reinforcing member 15 mounted inside the front pillar 10 is a thin-walled member having a channel cross-sectional shape and including flanges 16 and a web 17, with a band plate-shaped connection rib 16a formed at a leading end of each flange 16. The front pillar reinforcing member 15 is disposed inside the front pillar 10 so that the flanges 16 and the web 17 intersect a longitudinal direction of the front pillar 10 and that the web 17 is located on the side of the front pillar inner panel 13. The front pillar reinforcing member 15 is fixed inside the front pillar 10 by having each connection rib 16a spot-welded to an inner surface of the front pillar outer panel 11.

The dashboard panel 30 is a plate member that separates the engine compartment 56 and the cabin from each other. As shown in FIG. 2, the dashboard cross-member 31 is formed by bending a metal thin plate into a channel shape and creating a band plate-shaped connection rib 31a at a leading end of each bent part. The dashboard cross-member 31 is fixed to the dashboard panel 30 by having the connection ribs 31a spot-welded to the dashboard panel 30, and serves to reinforce the dashboard panel 30. An end of the dashboard cross-member 31 in the vehicle width direction is fastened to the front pillar brace 32 of the front pillar inner gusset 38.

As shown in FIG. 2, the inner panel reinforcing member 35 is a cylindrical reinforcing member that is disposed on the rear side of the front pillar 10 in the vehicle front-rear direction and extends in the vehicle width direction, and a steering wheel (not shown) is mounted on the inner panel reinforcing member 35. An end of the inner panel reinforcing member 35 in the vehicle width direction is fastened to the connection arm 34 of the front pillar inner gusset 38.

Figure 3:
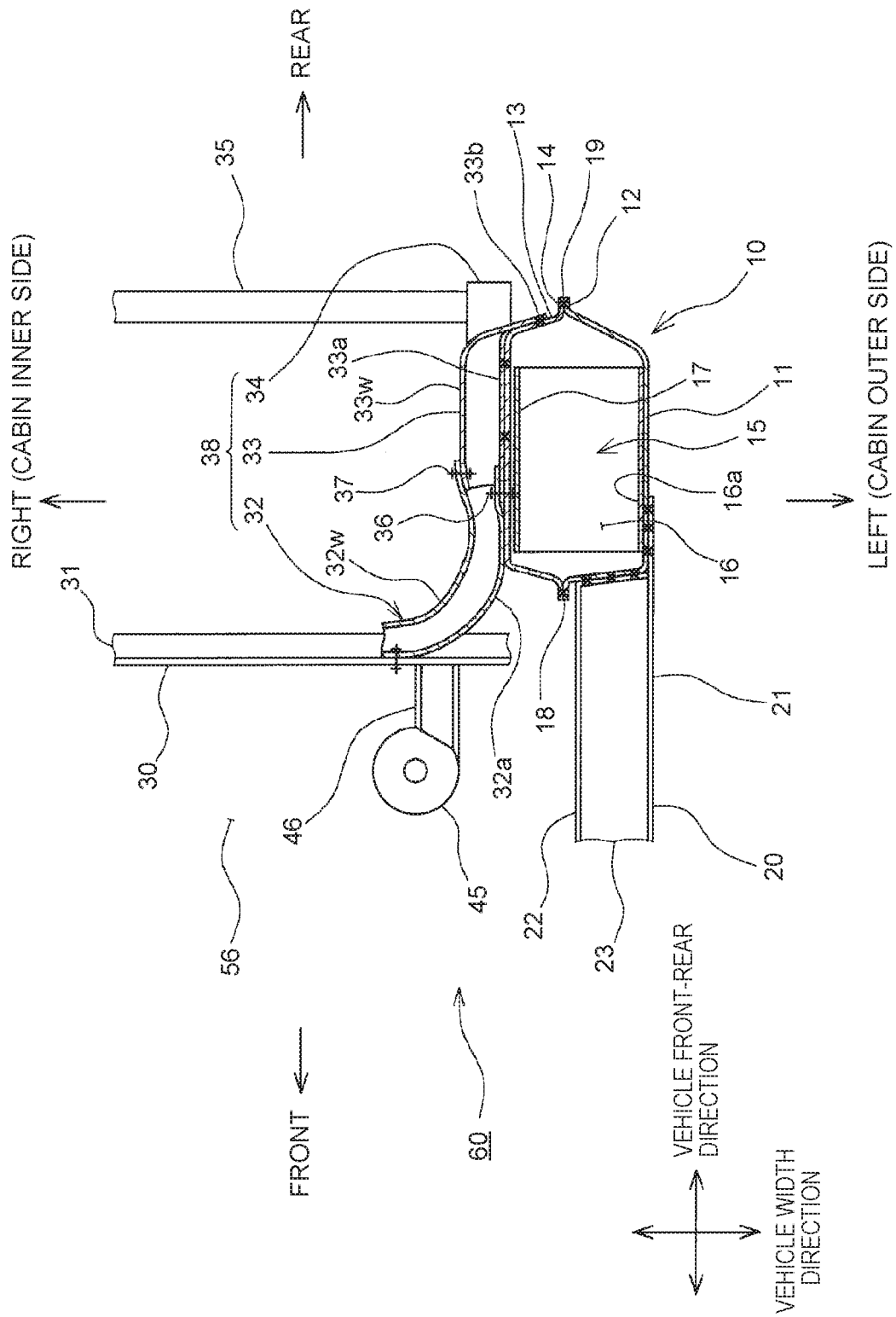
FIG. 3 is a plan view showing the front structure shown in FIG. 2.
Figure 4:
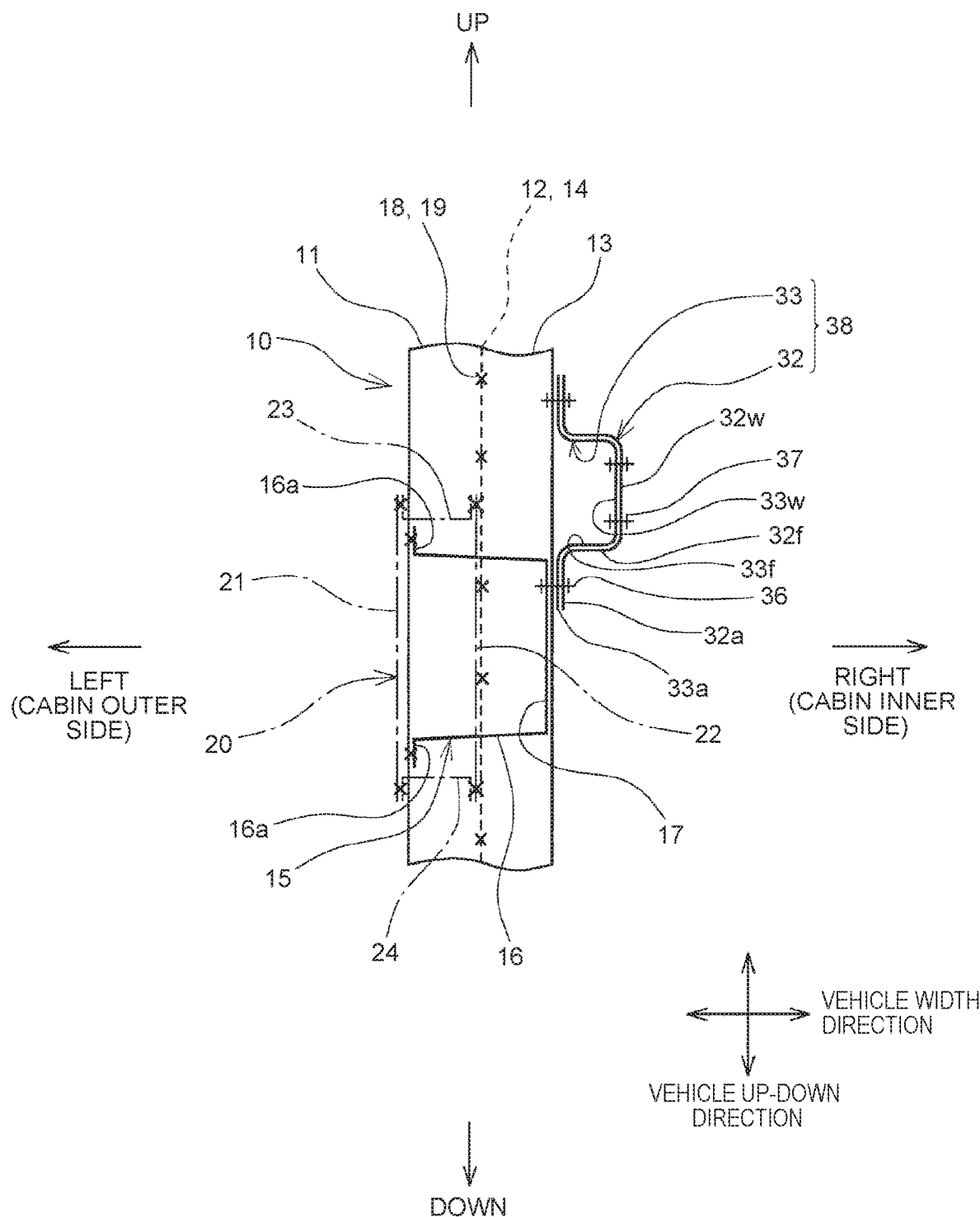
FIG. 4 is an elevation view of the front structure shown in FIG. 2, as seen from a vehicle rear side.

As described above, the front pillar inner gusset 38 is composed of the gusset main body 33, the front pillar brace 32, and the connection arm 34. As shown in FIG. 2, the gusset main body 33 has a box shape with the width decreasing toward the vehicle front side, and band plate-shaped connection ribs 33a that come in contact with an outer surface of the front pillar inner panel 13 are formed around the gusset main body 33. The connection rib 33a is spot-welded to the outer surface of the front pillar inner panel 13, and is fastened with a fastening bolt 36 to the web 17 of the front pillar reinforcing member 15 as shown in FIG. 3 and FIG. 4. The fastening bolt 36 fastens together the connection rib 33a, the front pillar inner panel 13, the web 17 of the front pillar reinforcing member 15, and a connection rib 32a of the front pillar brace 32 to be described later. As shown in FIG. 3, a joint portion 33b on the rear side of the gusset main body 33 in the vehicle front-rear direction is joined by spot welding to a surface of the front pillar inner panel 13 facing the vehicle rear side. The cross marks in FIG. 3 to FIG. 10 indicate spot welding points.

As shown in FIG. 2, the front pillar brace 32 is an arc-shaped member that connects the front pillar 10 and the dashboard cross-member 31 to each other. As shown in FIG. 2 and FIG. 4, the front pillar brace 32 is formed by bending a plate so as to have a channel cross-sectional shape and creating the band plate-shaped connection rib 32a at a leading end of each channel wall 32f. An end of the connection rib 32a on the side of the dashboard panel 30 is fastened with bolts etc. to the dashboard cross-member 31. As shown in FIG. 3 and FIG. 4, an end of the connection rib 32a on the side of the front pillar 10 is fastened with the fastening bolt 36 along with the connection rib 33a of the gusset main body 33, the front pillar inner panel 13, and the web 17 of the front pillar reinforcing member 15. Thus, the front pillar inner gusset 38 (the front pillar brace 32 and the gusset main body 33), the front pillar inner panel 13, and the web 17 of the front pillar reinforcing member 15 are integrally fastened together with the fastening bolt 36. A protrusion 32w of the front pillar brace 32 is fastened with bolts 37 to a protrusion 33w of the gusset main body 33. As shown in FIG. 2 and FIG. 3, the connection arm 34 on which the inner panel reinforcing member 35 is mounted is mounted by spot welding etc. on a surface of the gusset main body 33 facing the vehicle rear side.

Thus, the front pillar 10, the dashboard cross-member 31, the inner panel reinforcing member 35, and the front pillar inner gusset 38 are connected to one another. Accordingly, the end of the dashboard cross-member 31 in the vehicle width direction and the end of the inner panel reinforcing member 35 in the vehicle width direction are each connected through the front pillar inner gusset 38 to the front pillar 10 and the front pillar reinforcing member 15.

As shown in FIG. 3 and FIG. 4, the upper member 20 is formed by assembling an outer plate 21, an inner plate 22, and an upper plate 23 and a lower plate 24 that connect the outer plate 21 and the inner plate 22 to each other, by spot welding so as to form a rectangular tubular shape. As shown in FIG. 3, the outer plate 21 is fastened by spot welding to a surface of the front pillar outer panel 11 facing the outer side of the cabin. The inner plate 22, the upper plate 23, and the lower plate 24 are fastened by spot welding to a surface of the front pillar outer panel 11 facing the vehicle front side. As shown in FIG. 4, the positions of the upper plate 23 and the lower plate 24 of the upper member 20 in a vehicle up-down direction are substantially the same as the positions of the flanges 16 of the front pillar reinforcing member 15 in the vehicle up-down direction. Thus, the upper member 20 is fastened to the front pillar 10 near the position at which the front pillar reinforcing member 15 is mounted inside the front pillar 10. To clearly represent the upper plate 23, the lower plate 24, and the flanges 16, FIG. 4 schematically shows these members at positions in the up-down direction that are slightly shifted from their actual positions.

As shown in FIG. 4, the position of the upper flange 16 of the front pillar reinforcing member 15 in the vehicle up-down direction is substantially the same as the positions of one channel wall 32f of the protrusion 32w of the front pillar brace 32 and one channel wall 33f of the protrusion 33w of the gusset main body 33 in the vehicle up-down direction.

Figure 5:
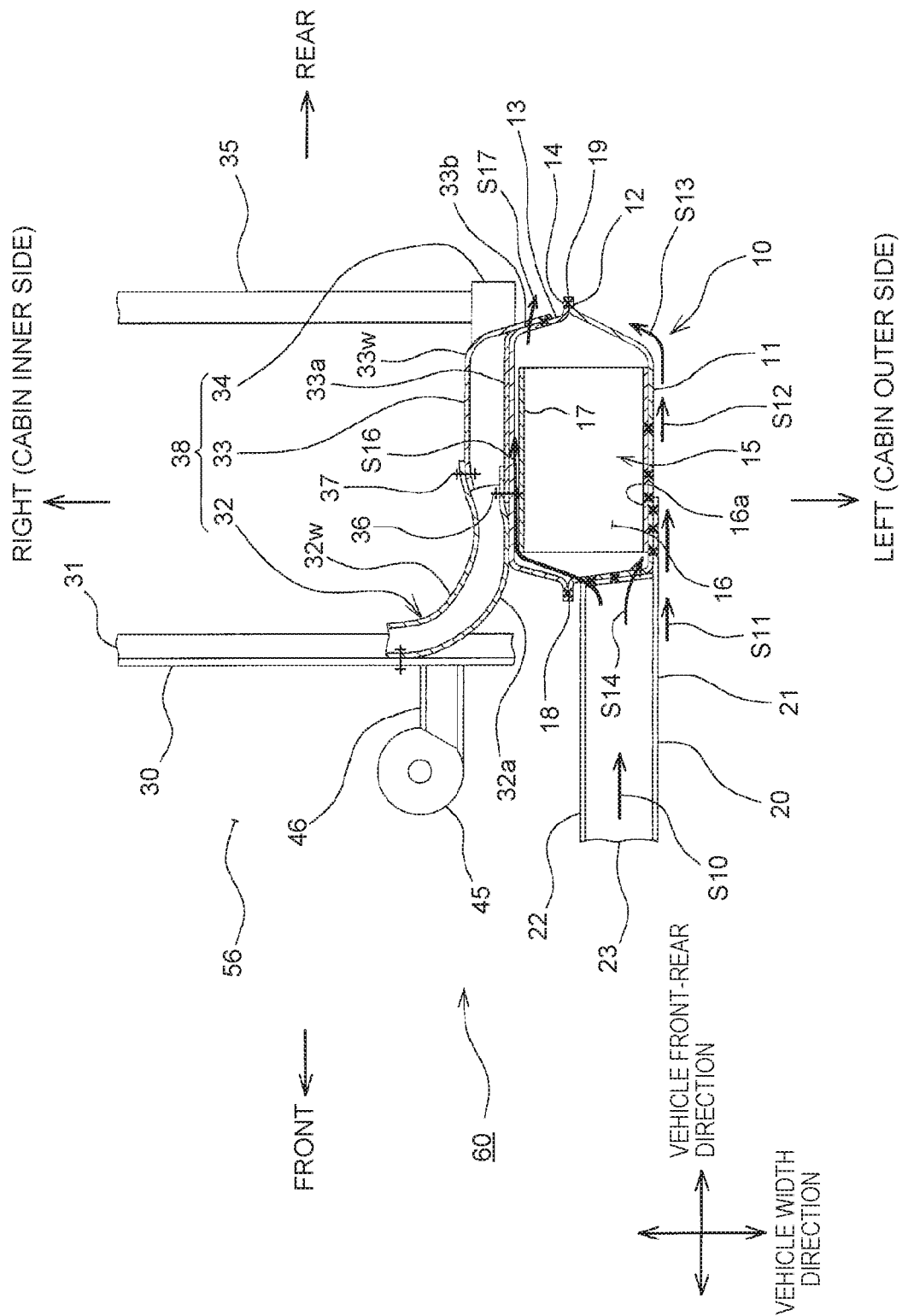
FIG. 5 is a plan view showing a transmission path of a collision load that is applied to an upper member in the event of a frontal collision of the vehicle including the front structure shown in FIG. 2.

Next, a transmission path of a load that is applied to the upper member 20 and the resulting deformation in the event of a frontal collision of the vehicle 100 including the front structure 60 of the above configuration will be described with reference to FIG. 5 to FIG. 7. If the vehicle 100 is involved in a frontal collision, the collision load is transmitted from the front reinforcing member 50 shown in FIG. 1 to the upper member 20. Part of the collision load input into the upper member 20 as indicated by the arrow S10 in FIG. 5 is transmitted from the outer plate 21 of the upper member 20 to the front pillar outer panel 11 as indicated by the arrow S11 in FIG. 5. Another part of the collision load is transmitted from the upper plate 23 and the lower plate 24 of the upper member 20 to a surface of the front pillar outer panel 11 facing the vehicle front side as indicated by the arrow S14 in FIG. 5. The former presses the front pillar outer panel 11 toward the vehicle rear side as indicated by the arrows S12, S13 in FIG. 5, while the latter is transmitted to the front pillar inner panel 13 as indicated by the arrow S16 in FIG. 5 and presses the front pillar inner panel 13 toward the vehicle rear side as indicated by the arrow S17 in FIG. 5.

Figure 6:
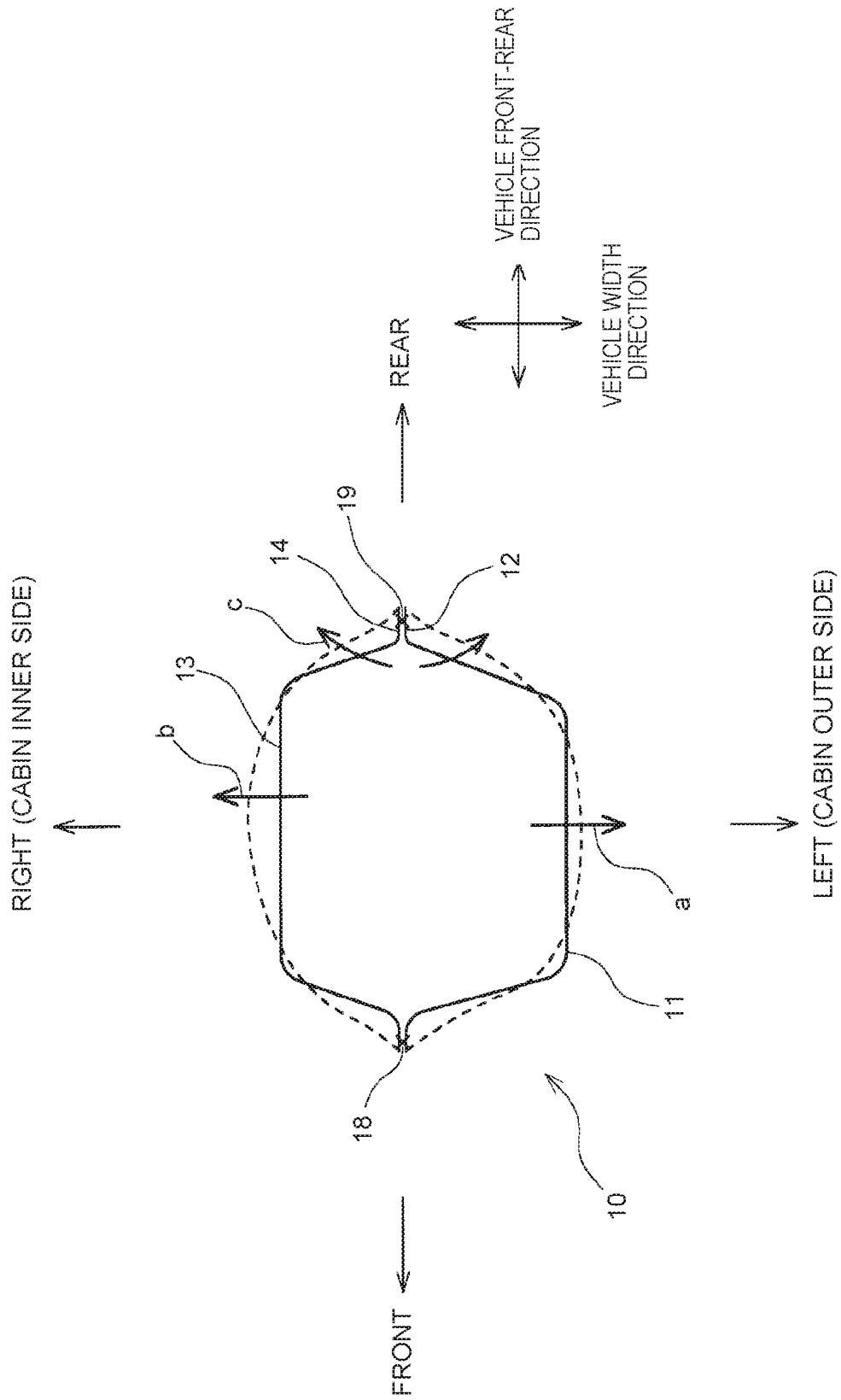
FIG. 6 is a plan view showing deformation of a front pillar under a collision load applied to the upper member in the event of a frontal collision of the vehicle including the front structure shown in FIG. 2.
Figure 7:
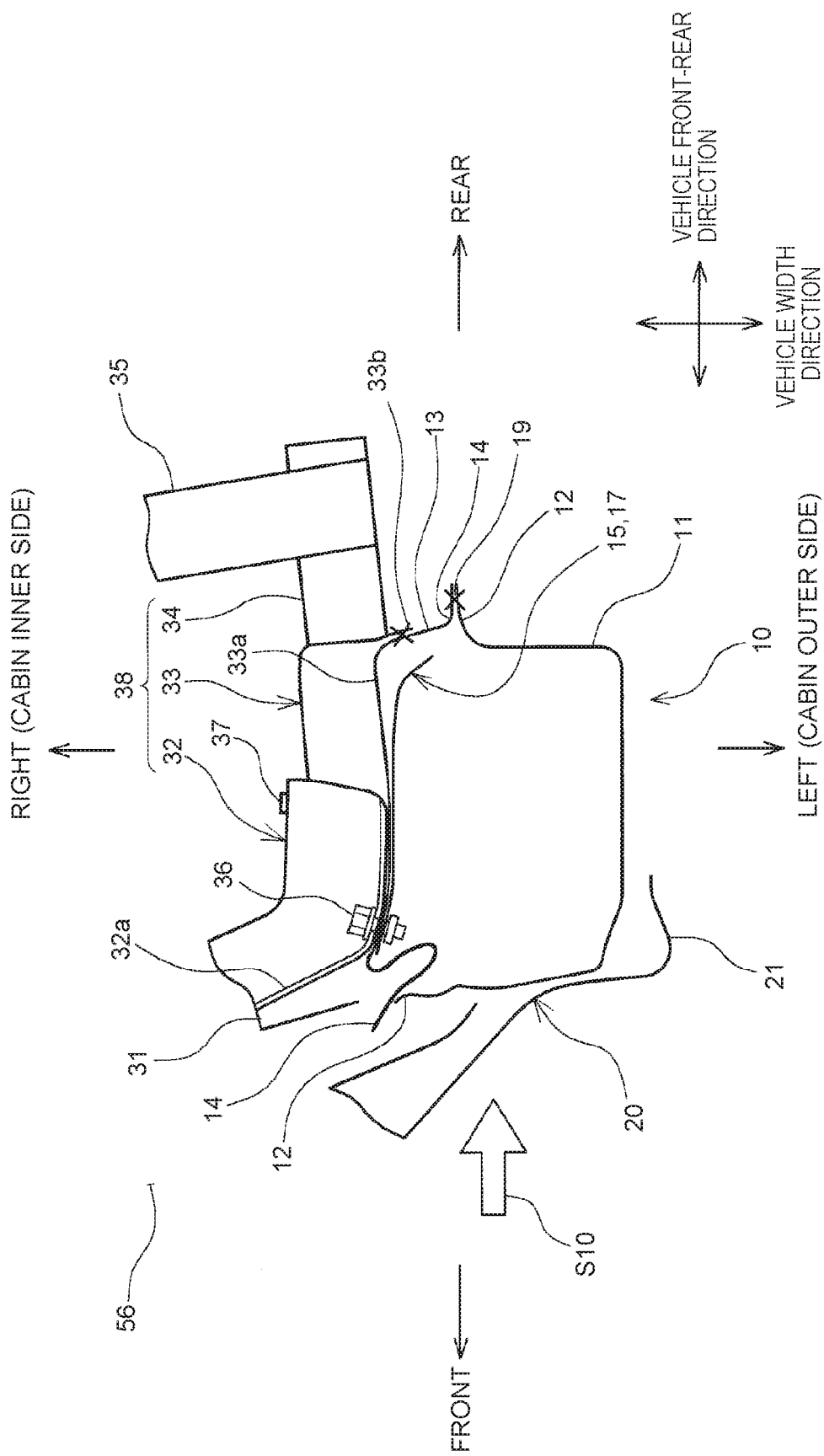
FIG. 7 is a plan view showing deformation of parts under a collision load applied to the upper member in the event of a frontal collision of the vehicle including the front structure shown in FIG. 2.

Under this collision load, the front pillar outer panel 11 tries to deform toward the outer side of the cabin as indicated by the dashed line and the arrow a in FIG. 6. Meanwhile, the front pillar inner panel 13 tries to deform toward the inner side of the cabin as indicated by the dashed line and the arrow b in FIG. 6. Thus, the front pillar outer panel 11 and the front pillar inner panel 13 try to deform so as to expand in the vehicle width direction. As a result, the sides of the connection ribs 12, 14 facing an inner surface of the front pillar 10 open in the vehicle width direction as indicated by the arrows c in FIG. 6, so that the welded joints 18, 19 are subjected to a load acting in such a direction that the welded joints 18, 19 are torn apart in the vehicle width direction.

On the other hand, as shown in FIG. 4, the upper member 20 is fastened to the front pillar 10 near the position at which the front pillar reinforcing member 15 is mounted inside the front pillar 10, and the front pillar reinforcing member 15 is fastened to the front pillar outer panel 11 and the front pillar inner panel 13. Therefore, as shown in FIG. 7, in the event of a frontal collision of the vehicle 100, the front pillar reinforcing member 15 functions to keep the front pillar outer panel 11 and the front pillar inner panel 13 from deforming so as to expand in the vehicle width direction, so that no such load as will tear apart the welded joint 19, located on the rear side in the vehicle front-rear direction, in the vehicle width direction is exerted. Thus, in the event of a frontal collision, tearing apart of the welded joint 19 on the rear side in the vehicle front-rear direction will not occur as shown in FIG. 7. It is therefore possible to restrain the backward displacement of the front pillar 10 and the front pillar inner gusset 38, and thereby to restrain the backward displacement of the dashboard cross-member 31 and the inner panel reinforcing member 35 fastened to the front pillar inner gusset 38.

Thus, in the front structure 60 of this embodiment, the upper member 20 is fastened to the front pillar 10 near the position at which the front pillar reinforcing member 15 is mounted inside the front pillar 10, and the front pillar reinforcing member 15 is fastened to the front pillar outer panel 11 and the front pillar inner panel 13, so that the front pillar reinforcing member 15 functions to keep the front pillar outer panel 11 and the front pillar inner panel 13 from deforming so as to expand in the vehicle width direction. Moreover, the front pillar reinforcing member 15 functions to transmit a collision load transmitted thereto from the upper member 20 to the front pillar 10 so as to disperse the load throughout the entire front pillar 10. In the event of a frontal collision, therefore, it is possible to prevent the collision load transmitted from the upper member 20 to the front pillar 10 from tearing apart the welded joint 19 on the rear side in the vehicle front-rear direction, and thereby to restrain the backward displacement of the dashboard cross-member 31 and the inner panel reinforcing member 35 fastened to the front pillar inner gusset 38. Moreover, the vehicle 100 can be decelerated more effectively in the event of a frontal collision.

Figure 10:
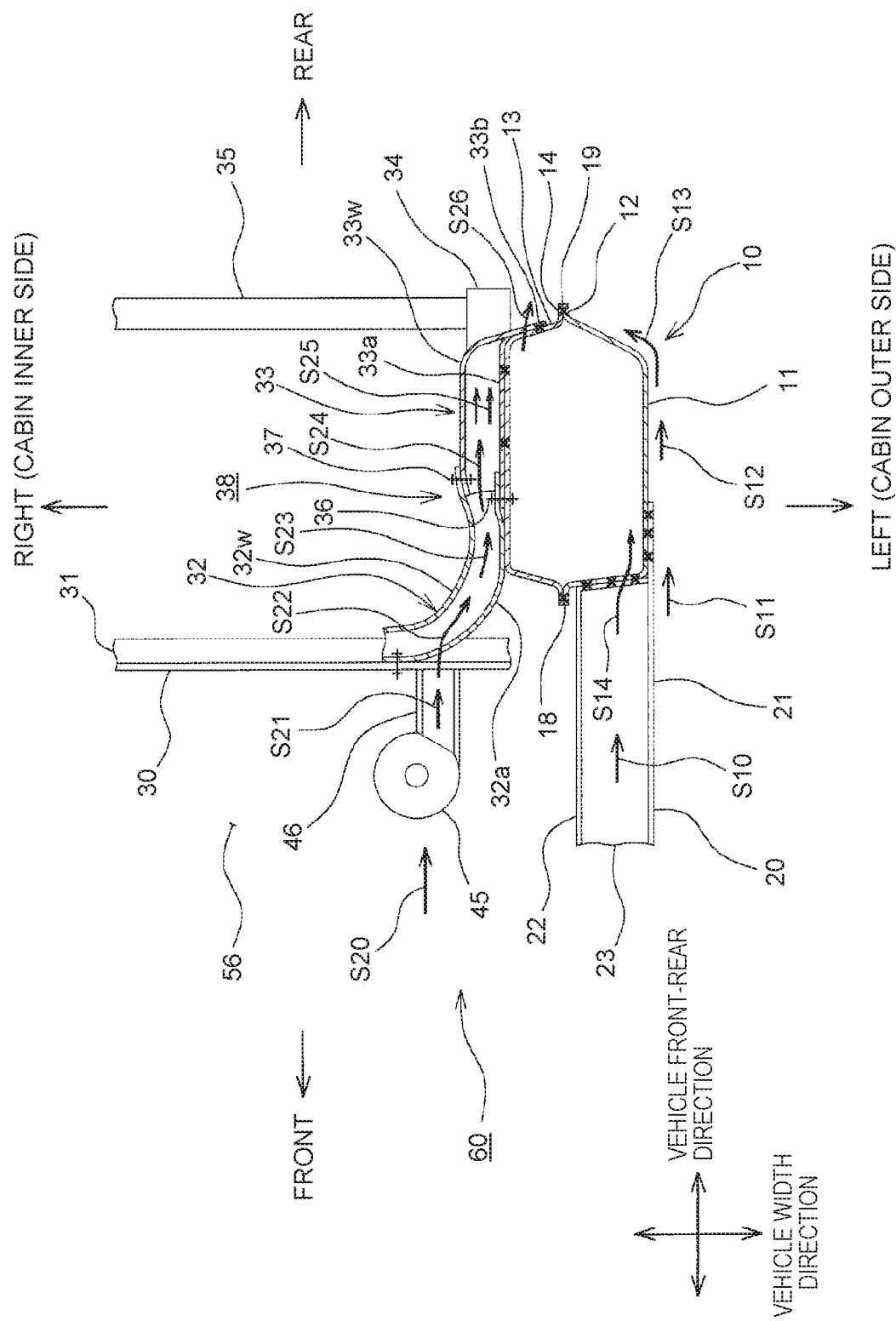
FIG. 10 is a plan view showing transmission paths of a collision load applied to an upper member and a collision load applied from a suspension tower to a dashboard panel in the event of a frontal collision of a vehicle including a front structure of the related art.

By contrast, when, as in the related art shown in FIG. 10, the mounting positions of the upper member 20 and the front pillar reinforcing member 15 are not aligned, or the front pillar reinforcing member 15 is not fastened to the front pillar outer panel 11 and the front pillar inner panel 13, in the event of a frontal collision, the front pillar outer panel 11 and the front pillar inner panel 13 deform under the collision load transmitted from the upper member 20 so as to expand in the vehicle width direction as indicated by the dashed lines and the arrows a, b in FIG. 6. Thus, in the event of a frontal collision, the welded joint 19 on the rear side in the vehicle front-rear direction is torn apart, causing the front pillar outer panel 11 and the front pillar inner panel 13 to be displaced backward toward the vehicle rear side. As a result, the front pillar inner gusset 38 is displaced backward along with the front pillar 10, and the dashboard cross-member 31 and the inner panel reinforcing member 35 fastened to the front pillar inner gusset 38 are also displaced backward.

As has been described above, compared with the front structure of the related art as shown in FIG. 10, the front structure 60 of this embodiment can effectively restrain the backward displacement of the dashboard cross-member 31 and the inner panel reinforcing member 35.

Next, a transmission path of a collision load applied from the suspension tower 45 to the dashboard panel 30 in the event of a frontal collision of the vehicle 100 and the resulting deformation will be described with reference to FIG. 8 and FIG. 9. If the vehicle 100 is involved in a frontal collision, the collision load is transmitted from the upper member 20 to the front pillar 10 as described with reference to FIG. 5 to FIG. 7. At the same time, the collision load transmitted to the upper member 20 is transmitted from the suspension tower 45 through the suspension tower brace 46 to the dashboard panel 30 as shown in FIG. 8 and FIG. 9.

Figure 8:
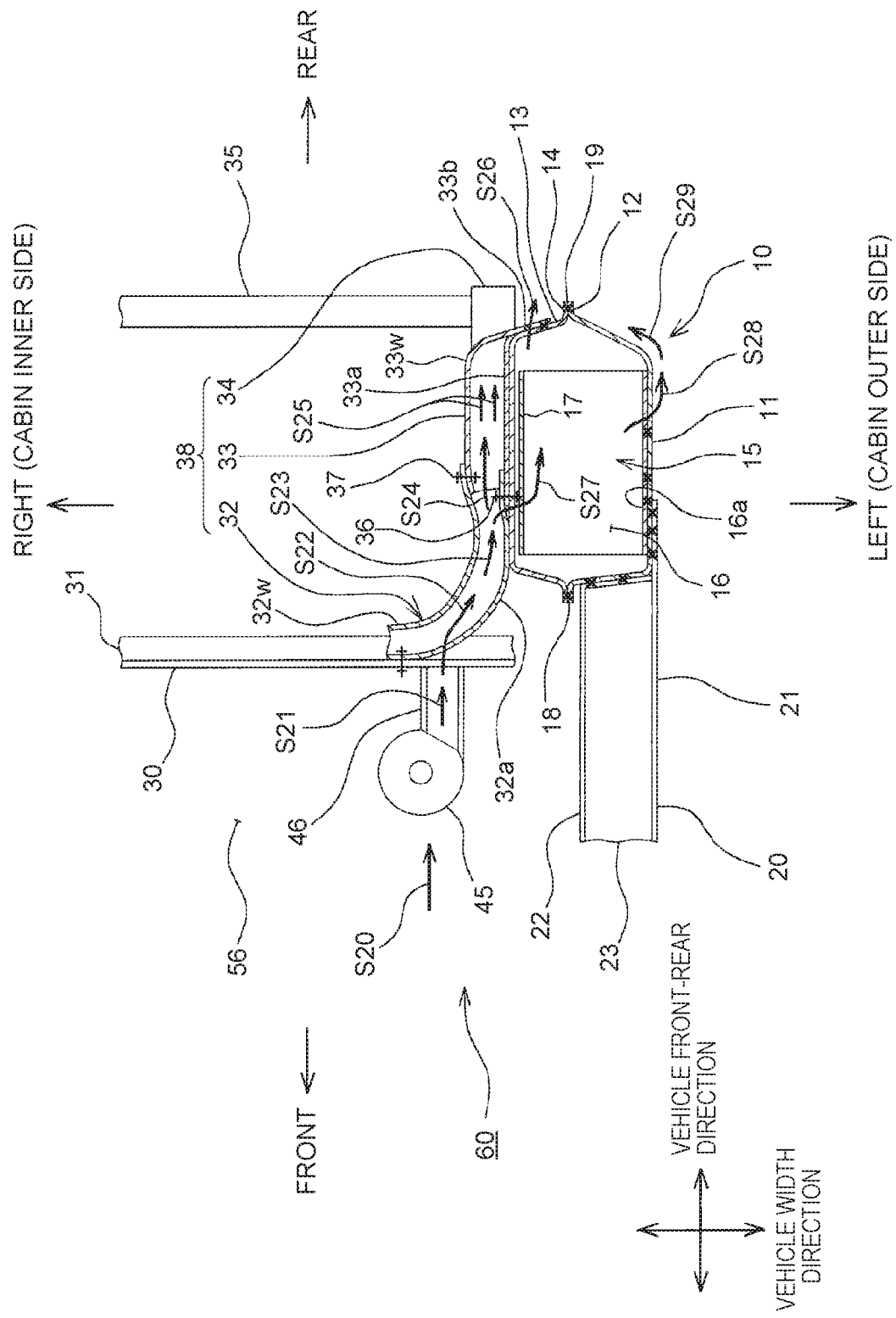
FIG. 8 is a plan view showing a transmission path of a collision load applied from a suspension tower to a dashboard panel in the event of a frontal collision of the vehicle including the front structure shown in FIG. 2.
Figure 9:
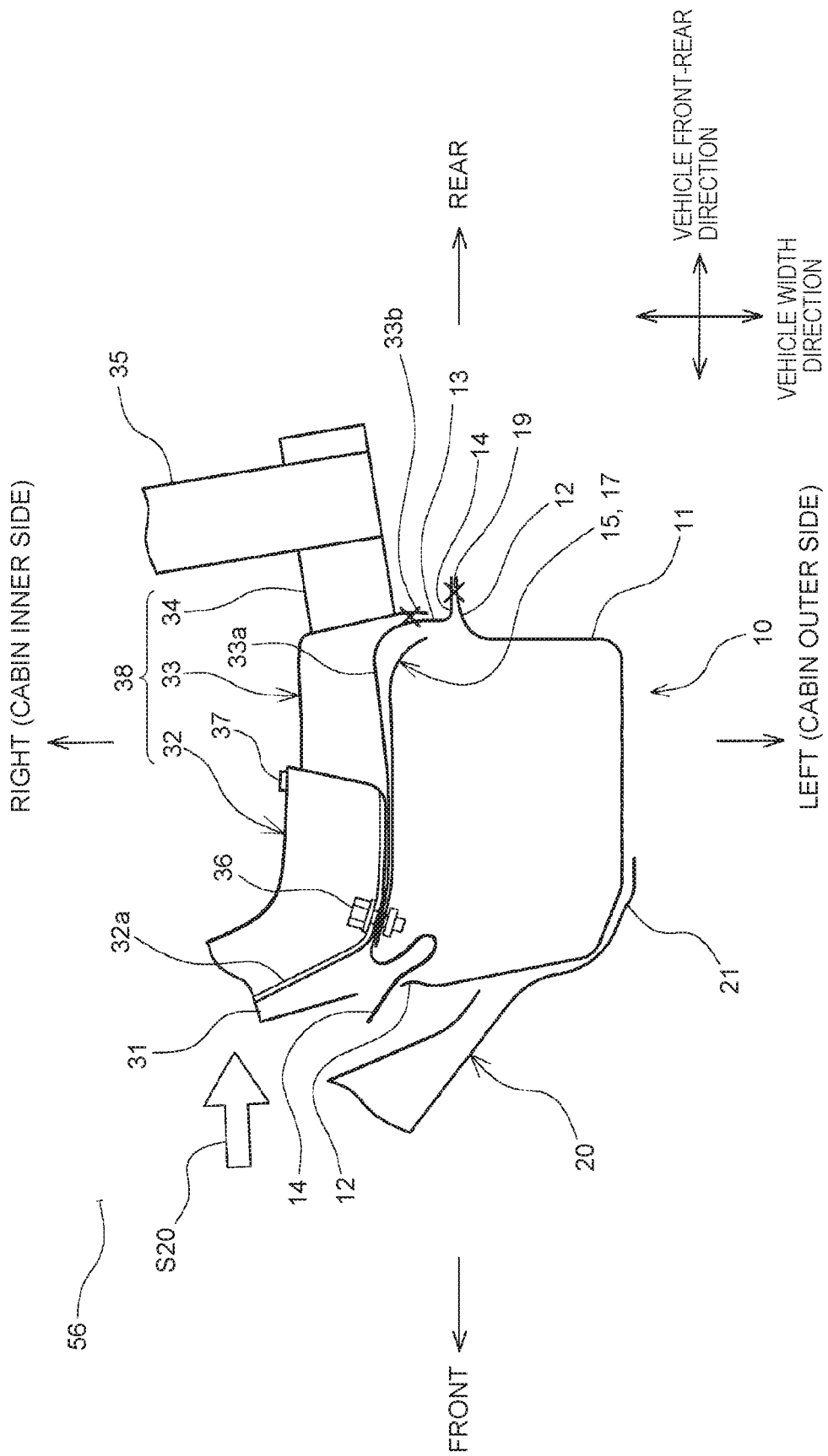
FIG. 9 is a plan view showing deformation of parts under a collision load applied from the suspension tower to the dashboard panel in the event of a frontal collision of the vehicle including the front structure shown in FIG. 2.

The collision load transmitted from the upper member 20 to the suspension tower 45 as indicated by the arrow S20 in FIG. 8 is transmitted through the suspension tower brace 46 to the dashboard panel 30 and the dashboard cross-member 31 as indicated by the arrow S21 in FIG. 8. The collision load transmitted to the dashboard cross-member 31 is transmitted through the front pillar brace 32 to the gusset main body 33 as indicated by the arrows S22, S23, S24 in FIG. 8. The collision load transmitted to the gusset main body 33 presses the gusset main body 33 toward the vehicle rear side relative to the front pillar inner panel 13 as indicated by the arrows S25, S26 in FIG. 8. At this point, as shown in FIG. 9, the front pillar brace 32 tries to deform under the collision load toward the vehicle rear side, and the gusset main body 33 connected to the front pillar brace 32 tries to deform toward the inner side of the cabin. Thus, the joint portion 33b between the gusset main body 33 and the front pillar inner panel 13 is subjected to a load acting in the vehicle front-rear direction that will tear apart the joint portion 33b.

However, the gusset main body 33 and the front pillar brace 32 are fastened with the fastening bolt 36 to the front pillar inner panel 13 and the front pillar reinforcing member 15, so that the collision load is transmitted from the front pillar brace 32 and the gusset main body 33 through the fastening bolt 36 to the front pillar reinforcing member 15 as indicated by the arrow S27 in FIG. 8, and is then transmitted from the front pillar reinforcing member 15 to the front pillar outer panel 11 as indicated by the arrows S28, S29 in FIG. 8. In other words, in the event of a frontal collision, the collision load acting in the front-rear direction that is transmitted to the front pillar inner gusset 38 is transmitted through the front pillar reinforcing member 15 to the front pillar outer panel 11. Thus, the load acting in the vehicle front-rear direction that will tear apart the joint portion 33b between the gusset main body 33 and the front pillar inner panel 13 is reduced, so that tearing apart of the joint portion 33b is prevented as shown in FIG. 9. It is therefore possible to restrain the backward displacement of the front pillar brace 32, the gusset main body 33, and the connection arm 34 composing the front pillar inner gusset 38, and thereby to restrain the backward displacement of the dashboard cross-member 31 and the inner panel reinforcing member 35 fastened to the front pillar inner gusset 38.

By contrast, when the front pillar inner gusset 38 and the front pillar reinforcing member 15 are not fastened to each other as in the related art shown in FIG. 10, a collision load transmitted from the suspension tower 45 causes the front pillar inner gusset 38 to be displaced backward, so that the joint portion 33b between the gusset main body 33 and the front pillar inner panel 13 is subjected to a load acting in the vehicle front-rear direction so as to tear apart the joint portion 33b. Then, the joint portion 33b is torn apart, and moreover, the front pillar inner gusset 38 is displaced backward, so that the dashboard cross-member 31 and the inner panel reinforcing member 35 fastened to the front pillar inner gusset 38 are also displaced backward.

As has been described above, compared with the front structure of the related art as shown in FIG. 10, the front structure 60 of this embodiment can effectively restrain the backward displacement of the dashboard cross-member 31 and the inner panel reinforcing member 35.

The front pillar 10 of the above front structure 60 has been described as being formed by joining together the front pillar outer panel 11 and the front pillar inner panel 13, both being a thin-walled member having a channel cross-sectional shape, by spot welding. However, the configuration of the front pillar 10 is not limited to this example. For example, the front pillar 10 may be a member formed by spot welding four plates that are front, rear, right, and left plates, or may be a cylindrical drawn member having no welded joint. The dashboard cross-member 31 and the front pillar brace 32 have been described as being formed by bending a metal thin plate into a channel shape, while the gusset main body 33 has been described as being formed by molding a thin plate into a box shape. However, the shapes of these members are not limited to these examples. For example, the dashboard cross-member 31 and the front pillar brace 32 may be rectangular tubular members, and the gusset main body 33 may be formed by a thick-walled strong member. The upper member 20 has been described as being formed by spot welding four plate materials, namely the outer plate 21, the inner plate 22, the upper plate 23, and the lower plate 24. However, the configuration of the upper member 20 is not limited to this example. For example, as with the front pillar 10, the upper member 20 may be a member formed by welding together outer and inner plate members, or may be a cylindrical drawn member having no welded joint.

The front pillar inner gusset 38 has been described as being composed of three members, namely the gusset main body 33, the front pillar brace 32, and the connection arm 34, but the front pillar inner gusset 38 may instead be an integral member. The front pillar inner gusset 38 (the front pillar brace 32 and the gusset main body 33), the front pillar inner panel 13, and the web 17 of the front pillar reinforcing member 15 have been described as being integrally fastened together with the fastening bolt 36. However, instead of the fastening bolt 36, other connection means, such as welding or rivets, may be used to join together these members.

As long as the front pillar brace 32 and the gusset main body 33 of the front pillar inner gusset 38 are fastened to the front pillar reinforcing member 15, the front pillar brace 32 and the gusset main body 33 need not be fastened to the front pillar inner panel 13.

Thus, the present disclosure is not limited to the above-described embodiment, but includes all possible modifications and corrections that do not depart from the technical scope and the essence of the disclosure defined by the claims.

What is claimed is:

1. A vehicle front structure comprising:
    a tubular front pillar;
    a front pillar reinforcing member mounted inside the front pillar;
    a dashboard cross-member that is mounted on a dashboard panel disposed on a front side of the front pillar in a vehicle front-rear direction and extends in a vehicle width direction;
    an inner panel reinforcing member that is disposed on a rear side of the front pillar in the vehicle front-rear direction and extends in the vehicle width direction; and
    a front pillar inner gusset to which an end of the dashboard cross-member in the vehicle width direction and an end of the inner panel reinforcing member in the vehicle width direction are connected, wherein
    the front pillar inner gusset includes:
        a front pillar brace provided on a vehicle front side, the front pillar brace being attached to an inner side surface of the front pillar in the vehicle width direction, wherein the end of the dashboard cross-member in the vehicle width direction is connected to the front pillar brace; and
        a gusset body provided on a vehicle rear side, wherein the end of the inner panel reinforcing member in the vehicle width direction is connected to the gusset body,
    the front pillar is a hollow elongated member composed of a front pillar outer panel and a front pillar inner panel, both being a thin-walled elongated member having a channel cross-sectional shape, that are connected to each other so that the front pillar has a substantially rectangular tubular shape,
    the front pillar reinforcing member is a thin-walled member having a channel cross-sectional shape and including flanges and a web, and is mounted inside the front pillar so that the flanges and the web intersect the front pillar as seen from the vehicle width direction and that the web is located on a side of the front pillar inner panel, and
    the front pillar brace, the gusset body, the front pillar inner panel, and the web of the front pillar reinforcing member are fastened together with a bolt.

2. The vehicle front structure according to claim 1, further comprising an upper member that is disposed on the front side of the front pillar in the vehicle front-rear direction, and is fastened to the front pillar near a position at which the front pillar reinforcing member is mounted inside the front pillar.

3. The vehicle front structure according to claim 2, wherein:
    the upper member is fastened to the front pillar outer panel.

4. The vehicle front structure according to claim 3, wherein the flanges are fixed to an inner surface of the front pillar outer panel.

5. The vehicle front structure according to claim 1, wherein the flanges are fixed to an inner surface of the front pillar outer panel.

* * * * *

UNITED STATES PATENT AND TRADEMARK OFFICE
CERTIFICATE OF CORRECTION

PATENT NO. : 10,618,561 B2
APPLICATION NO. : 15/921993
DATED : April 14, 2020
INVENTOR(S) : Kenshi Tomiki It is certified that error appears in the above-identified patent and that said Letters Patent is hereby corrected as shown below:

On the Title Page

Item (72), inventor, city, delete "Ichinomiya" and insert --Ichinomiya-shi Aichi-ken--, therefor.

In the Specification

In Column 6, Line 58, delete "tom" and insert --torn--, therefor.

Signed and Sealed this
Eighth Day of June, 2021

Drew Hirshfeld
*Performing the Functions and Duties of the
Under Secretary of Commerce for Intellectual Property and
Director of the United States Patent and Trademark Office*